United States Patent
Edwards

(10) Patent No.: US 11,287,285 B2
(45) Date of Patent: Mar. 29, 2022

(54) METHODS AND SYSTEMS FOR DISTRIBUTED VERIFICATION AND CONTROL OF A RESOURCE DISTRIBUTION NETWORK

(71) Applicant: LANDIS+GYR INNOVATIONS, INC., Alpharetta, GA (US)

(72) Inventor: Randy Edwards, Snellville, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 468 days.

(21) Appl. No.: 15/845,518

(22) Filed: Dec. 18, 2017

(65) Prior Publication Data
US 2019/0186951 A1   Jun. 20, 2019

(51) Int. Cl.
*G01D 4/00* (2006.01)
*H04W 84/18* (2009.01)
(Continued)

(52) U.S. Cl.
CPC ............ *G01D 4/004* (2013.01); *G05F 1/66* (2013.01); *G06F 16/951* (2019.01);
(Continued)

(58) Field of Classification Search
None
See application file for complete search history.

(56) References Cited

U.S. PATENT DOCUMENTS 8,566,046 B2 * 10/2013 Deaver, Sr. .......... G01R 31/025
                                                               702/58
8,712,711 B2 *  4/2014 Nayar .................... H02J 3/26
                                                              324/66
(Continued)

FOREIGN PATENT DOCUMENTS

JP    2005348541 A   * 12/2005
WO    2010083164       7/2010
WO    WO-2010077830 A2 * 7/2010 .......... H02J 13/0062

OTHER PUBLICATIONS

Wikipedia Entry on "Three-phase" (Snapshot take of Jul. 4, 2017 entry using Wayback Machine) (Year: 2017).*
(Continued)

*Primary Examiner* — Catherine T. Rastovski
*Assistant Examiner* — Leonard S Liang
(74) *Attorney, Agent, or Firm* — Kilpatrick Townsend & Stockton LLP

(57) ABSTRACT

A system may include a device including a sensor configured to measure a parameter of a resource distributed along a distribution line of the resource distribution system and one or more validation devices. Each validation device includes a sensor configured to measure the parameter of the resource distributed along the distribution line or a related parameter. When the device detects that the parameter is out-of-range condition, it sends a query to the validation devices requesting information on the parameter or the related parameter. When the information regarding the parameter or related parameter also indicates an out-of-range condition, then the system validates the out-of-range condition. After validating the condition, the system may control a resource regulation device to adjust the parameter.

16 Claims, 8 Drawing Sheets

(51) Int. Cl.
  *G06F 16/951*  (2019.01)
  *H02J 13/00*  (2006.01)
  *G05F 1/66*  (2006.01)
  *G06Q 50/06*  (2012.01)

(52) U.S. Cl.
  CPC .......... *H02J 13/0006* (2013.01); *G01D 4/002* (2013.01); *G06Q 50/06* (2013.01); *H04W 84/18* (2013.01)

(56) References Cited

U.S. PATENT DOCUMENTS

| | | | | |
|---|---|---|---|---|
| 8,966,069 B2* | 2/2015 | Vaswani | ................ | G01D 4/004 709/224 |
| 9,729,012 B2* | 8/2017 | Forbes, Jr. | ................ | H02J 3/14 |
| 9,897,665 B2* | 2/2018 | Taft | ................ | G01D 4/002 |
| 2004/0193329 A1* | 9/2004 | Ransom | ................ | H04L 63/20 700/286 |
| 2005/0247113 A1* | 11/2005 | Kahn | ................ | G01N 33/18 73/53.01 |
| 2008/0183339 A1* | 7/2008 | Vaswani | ................ | G01D 4/004 700/297 |
| 2009/0187358 A1* | 7/2009 | Deaver, Sr. | ................ | G01R 31/025 702/58 |
| 2009/0198384 A1* | 8/2009 | Ahn | ................ | G01D 4/004 700/292 |
| 2009/0281673 A1* | 11/2009 | Taft | ................ | G01D 4/002 700/286 |
| 2009/0281679 A1* | 11/2009 | Taft | ................ | G01D 4/004 700/297 |
| 2010/0060259 A1* | 3/2010 | Vaswani | ................ | H02J 3/00 324/86 |
| 2010/0275071 A1* | 10/2010 | DeCusatis | ................ | G06F 11/0724 714/56 |
| 2010/0332373 A1* | 12/2010 | Crabtree | ................ | G06Q 40/04 705/37 |
| 2011/0208364 A1* | 8/2011 | DeLoach, Jr. | ................ | H04Q 9/04 700/286 |
| 2012/0201145 A1* | 8/2012 | Ree | ................ | H04W 40/246 370/245 |
| 2012/0253540 A1* | 10/2012 | Coyne | ................ | G06Q 10/00 700/297 |
| 2012/0326503 A1* | 12/2012 | Birkelund | ................ | H02J 13/0006 307/24 |
| 2013/0049764 A1* | 2/2013 | Koliwad | ................ | G01R 31/086 324/522 |
| 2013/0173322 A1* | 7/2013 | Gray | ................ | G06Q 50/06 705/7.13 |
| 2013/0245849 A1* | 9/2013 | Paul | ................ | H02J 3/14 700/295 |
| 2014/0039699 A1* | 2/2014 | Forbes, Jr. | ................ | H04L 67/10 700/286 |
| 2014/0265574 A1* | 9/2014 | Tyler | ................ | H02J 3/382 307/31 |
| 2014/0277788 A1* | 9/2014 | Forbes, Jr. | ................ | H02J 13/00017 700/286 |
| 2014/0282550 A1* | 9/2014 | Blumenfeld | ................ | G01D 4/002 718/100 |
| 2015/0094968 A1* | 4/2015 | Jia | ................ | G01R 21/133 702/60 |
| 2015/0288693 A1* | 10/2015 | Hewitt | ................ | H04L 63/10 726/28 |
| 2015/0324582 A1* | 11/2015 | Vasseur | ................ | G06F 21/554 726/23 |
| 2017/0244279 A1* | 8/2017 | Itaya | ................ | H02J 3/12 |
| 2020/0244297 A1* | 7/2020 | Zalewski | ................ | H02N 11/002 |

OTHER PUBLICATIONS

International Patent Application No. PCT/US2018/064850, "International Search Report and Written Opinion", dated Mar. 29, 2019, 20 pages.

International Application No. PCT/US2018/064850, "Invitation to Pay Additional Fees and, Where Applicable, Protest Fee", dated Feb. 6, 2019, 16 pages.

* cited by examiner

| Node Identifier | Location | Upstream/downstream | Status | Parameter |
|---|---|---|---|---|
| 225 | distribution line 241 | N/A | Active | Voltage |
| 220 | distribution line 242 | N/A | Active | Voltage |
| | | | | |

501

| Node Identifier | Location | Upstream/downstream | Status | Parameter |
|---|---|---|---|---|
| 222 | distribution line 244 | N/A | Active | Voltage |
| 223 | distribution line 245 | N/A | Active | Voltage |
| 220 | distribution line 242 | upstream | Active | Voltage |
| | | | | |

METHODS AND SYSTEMS FOR DISTRIBUTED VERIFICATION AND CONTROL OF A RESOURCE DISTRIBUTION NETWORK

TECHNICAL FIELD

This invention relates generally to resource distribution systems and more specifically to a system of validation devices configured to measure parameters of a distributed resource at different points and detect and validate conditions in a resource distribution system.

BACKGROUND

Resources such as water, power, and gas are distributed to the consumers of the resource via resource distribution networks. Resource distribution networks are complex and availability of the resource is important to customers. Therefore, measurement of the parameters associated with the resource distribution, such as consumption, balance, operating status, etc., may be taken at multiple points in the network to form a complete picture of network activity. Such measurements allow corrections in the event of an out-of-range condition, in order to ensure resource availability, improve efficiency, or reduce costs, for example.

A resource provider detects out-of-range conditions at various points in the resource distribution network. An out-of-range condition can be a condition requiring optimization e.g., improving efficiency or distribution, an abnormality, or any other detectable condition. For example, a resource provider may measure the line voltage at the point of delivery of the resource, e.g., at a customer's premises. But in the event that an out-of-range condition is detected, a traditional system may reserve decision making or taking corrective action to a central system.

But entirely centralized condition detection and decision making may result in the system being slow to respond to critical conditions. For example a voltage deviation in an electrical distribution system may not be detected until a customer informs the service provider and a technician arrives at the customer's premises. The resource provider may then make changes in a central location, and those changes can propagate throughout the network.

SUMMARY

Certain aspects and features include a system and method for detecting a condition in a resource distribution system. In one example, the system is a device including a sensor configured to measure a first parameter of a resource distributed along a first distribution line of the resource distribution system. The system also includes a number of validation devices, each validation device including a sensor configured to measure the first parameter of the resource distributed along the first distribution line.

In one aspect, the device and each of the validation devices measure the first parameter of the resource at different points along the first distribution line of the resource distribution system. The device and each of the validation devices can be associated with different nodes on a wireless communications network. The device can be configured to compare a first measured value of the first parameter of the resource with a threshold range of values. When the first measured value of the first parameter is outside the threshold range of values, the device is configured to determine that an out-of-range condition exists at the device. The device sends a query via the wireless communication network to at least one of the validation devices requesting information regarding a second measured value of the first parameter measured by the validation device. The device is further configured to receive a response to the query via the wireless communication network. The response includes information regarding the second measured value of the first parameter. When the information regarding the second measured value indicates an out-of-range condition at the validation device, then the device validates the out of range condition and controls a resource regulation device to adjust the first parameter.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where:

FIG. 5 illustrates exemplary validation device tables.

DETAILED DESCRIPTION

Aspects of the present invention relate to using a system of validation devices configured to measure parameters of a distributed resource at different points, detect and validate out-of-range conditions, and take corrective action. The validation devices may be located throughout the resource distribution network and may provide local detection and correction of out-of-range conditions. The validation devices may be included in devices located at a customer's premises, such as a smart electric meter or a smart water meter, or may be located at intermediate points in the resource distribution system that are not associated with a customer premises. After detecting an out-of-range condition, a validation device may query other validation devices to validate the out-of-range condition prior to taking action.

For example, if a verification device at a customer premises detects an out-of-range condition, such as low voltage, the verification device may validate the condition with other validation devices. For example, the verification device may query other validation devices on the same distribution line and confirm that the other validation devices have detected a low voltage condition. By validating the out-of-range condition, the verification device may be better informed and thus make better decisions in addressing the out-of-range condition. The validation device can take corrective action such as sounding an alarm, disconnecting the power, adjusting a resource regulation device, or notifying a head end system.

Advantages to decision making at the end-points or at intermediate points of the resource distribution network include quicker network adjustment, improved customer experience, higher uptime and reliability, higher stability, and cost savings such as reduction in required labor to maintain the resource distribution network.

Exemplary Resource Distribution Network

Figure 1:
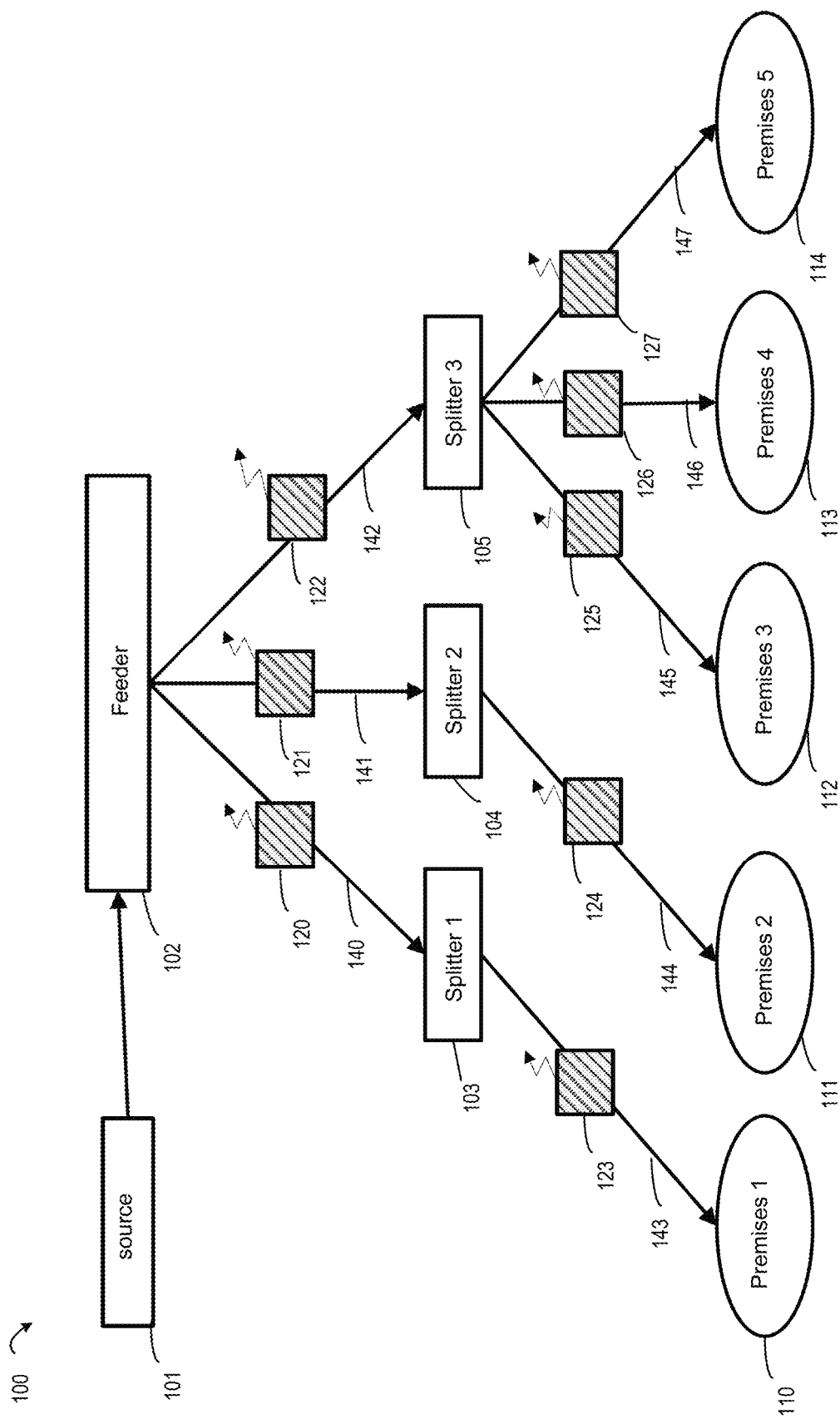
FIG. 1 illustrates an exemplary physical topology of a resource distribution network showing validation devices at various points.

FIG. 1 illustrates a physical topology of an exemplary resource distribution network showing validation devices at various points in the network. The resource distribution network 100 includes validation devices that are capable of measuring conditions, validating conditions with other validation devices, and taking corrective action as necessary.

The resource distribution network 100 includes a source 101. The source 101 can be a source of any distributable resource, e.g., electricity, water, or gas. The source 101 provides the resource to a feeder 102. The feeder 102 is a distribution device that controls the distribution of the resource. The feeder 102 can split the resource so that it is provided to multiple distribution lines, substations, or customers' premises. For example, FIG. 1 shows the feeder 102 splitting the resource into three distribution lines 140-142. Distribution lines may feed into other feeders or resource splitters, for example, distribution lines 140-142 feed into splitters 103-105 respectively. Splitter 105 splits distribution line 142 into distribution lines 145, 146, and 147. Distribution lines can terminate at a customer's premises. For example, distribution line 143 terminates at premises 110, distribution line 144 terminates at premises 111, distribution line 145 terminates at premises 112, distribution line 146 terminates at premises 113, and distribution line 147 terminates at premises 114.

Validation devices may be located at or near customer premises, e.g., validation devices 123-127. These types of validation devices may be located in or associated with a meter that measures the consumption of the resource. Validation devices may also be located at intermediate points along a distribution line, e.g., validation devices 120, 121, and 122.

A validation device may detect an out-of-range condition on a distribution line. For example, validation device 120 can detect an out-of-range condition on distribution line 140. Validation device 120 may query other validation devices to verify that the other devices are detecting conditions consistent with the out-of-range condition. The other validation devices may be detecting conditions on the same distribution line or on a different distribution line. For example, validation device 120 may query validation devices 121 and 122, which are located on different distribution lines or may query another validation device on the same distribution line (not shown). The selection of the validation devices used to verify the out-of-range condition may depend upon on the condition and on the topology of the resource distribution network.

A validation device may be an initiating validation device or initiating device, which queries other validation devices to verify an out-of-range condition, or a validation device may be a responding validation device or responding device, which responds to queries received from an initiating validation devices. A validation device may be both an initiating and a responding validation device or may be only an initiating validation device or a responding validation device.

After a validation device verifies an out-of-range condition, it may take action to address the condition. Actions can include controlling the resource, disconnecting from the resource distribution network, adjusting load, sending a notification, or generating an alarm. If a validation device cannot verify an out-of-range condition, then it may refrain from taking action to address the condition or may take further actions to attempt to validate the out-of-range condition.

Validation devices may communicate with each other and with other devices via one or more networks to which a validation device has connectivity, such as a smart grid or a mesh network. As discussed further with respect to FIG. 4, a validation device may connect to a communications network that uses a different topology than the resource distribution network.

Figure 2:
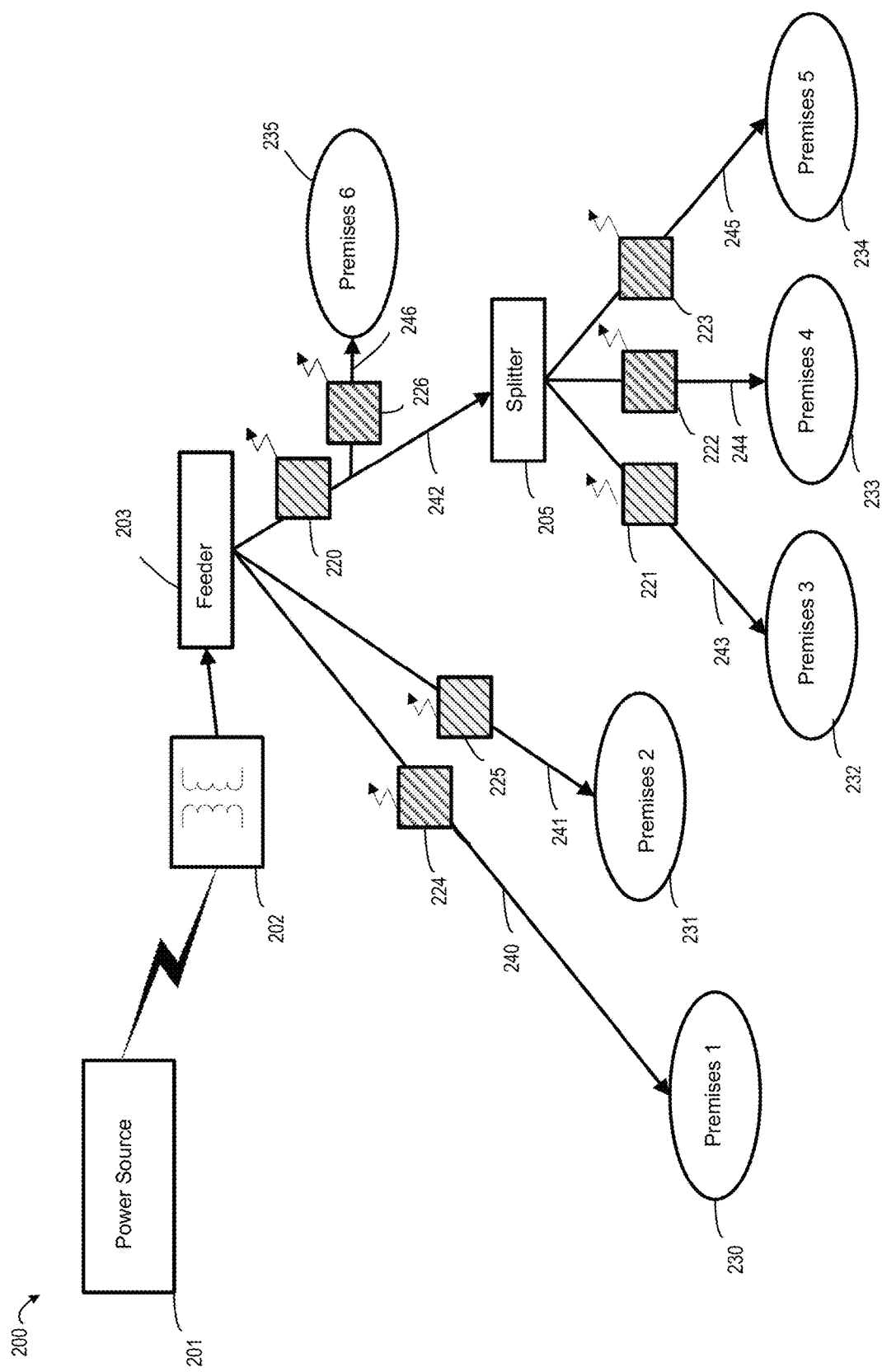
FIG. 2 illustrates an exemplary physical topology of a power distribution network showing validation devices at various points.

FIG. 2 illustrates an exemplary power distribution network showing validation devices at various points. Power distribution system 200 shows a power source 201, a transformer 202, a feeder 203, premises 230-235, a splitter 205, and seven validation devices 220-226. The power source 201 may be, for example, a power plant, solar panel, or some other power source. The transformer 202 transforms the voltage output from the power source 201 to a suitable level for a feeder 203. The feeder 203 feeds distribution lines 240-242. Distribution line 242 is received by splitter 205 and is split into three distribution lines, 243, 244, and 245.

Validation devices 221-226 can be associated with a distribution line, a distribution device, or a customer's premises and can detect parameters related to the distribution of electric power, for example, load, voltage, current, power consumption, volt-ampere reactive (VAR) power, or temperature. For example, validation devices 220-226 may measure voltage, current, and load on a standard 120-volt or 240-volt system.

An initiating validation device may query different responding validation devices depending upon the parameter being measured or the condition being detected. In some aspects, an initiating validation device may query one set of responding validation devices for one parameter, e.g., voltage, while querying another set of responding validation devices for another parameter, e.g., temperature. The set of responding validation devices may include both validation devices associated with a premises and validation devices associated with an intermediate location on the resource distribution network.

The set of responding validation devices may be based on the location of the devices relative to the power source. For example, initiating validation device 226 may detect an out-of-range condition, such as low voltage, on distribution line 246 and may query other validation devices that are located upstream of the validation device, for example, validation device 220. Validation device 226 may also query devices that are downstream, for example, validation devices 221, 222, or 223. The initiating validation device may validate a detected condition if the responses from the responding validation devices are consistent with the condition. The response from a responding validation device may be consistent with the condition even though the value of the parameter measured by the responding validation device may differ from the value of the parameter measured by the initiating validation device.

The set of responding validation devices may also be based on other factors including, but not limited to, one or more of the following: location within the same geographical area, connection to a common resource distribution device (e.g., connection to the same feeder), connection to a common communications network device (e.g., all nodes associated with the same collector), common hardware configurations (e.g., all endpoints using the same type of meter), or connection to a complementary network device or distribution line (e.g., connection to other phases in a three-phase system, connection to a different distribution line with same phase). In some scenarios, the location of the initiating validation device may be unrelated to the measured condition. The initiating validation device may receive data from the responding validation devices that reflects the measured condition.

The set of responding validation devices may also be based on a data-based relationship. For example, in an environment with multiple devices using different protocols or standards, a relationship between an initiating validation device and a responding validation device may be based on the responding validation device having data that can be processed by the initiating validation device. A relationship may also be based on the responding validation device having the capability to process and understand data received from the initiating validation device.

Validation devices 224, 225, and 220 are located on distribution lines 240, 241, and 242 respectively, which originate from the same feeder 203. Therefore, initiating validation device 224 may query responding validation devices 220 and 225 because the responding devices may provide useful information as to whether an out-of-range condition such as low voltage is occurring on other distribution lines originating from the feeder 203. A low voltage occurring on other lines may indicate that the problem may be upstream of validation device 224 and may involve the power source 201 or the feeder 203. Alternatively, if validation devices 220 and 225 do not detect an out-of-range condition, then the out-of-range condition may be limited to distribution line 240.

In some examples, a validation device may be associated with a distribution line distributing only one phase of a three-phase power distribution system. For example, each of a set of three distribution lines 243-245 may represent a different phase of a three-phase power generation and distribution system. For example, distribution line 243 may distribute a first phase, distribution line 244 may distribute a second phase, and distribution line 245 may distribute a third phase. If an initiating distribution device 221 detects an out-of-range condition, it may query responding distribution devices 222 and 223 to validate the condition even though they are associated with different phases.

Validation devices can be located at a customer's premises. For example, a validation device may be integrated with a smart meter. Validation devices located at a customer's premises can provide granular out-of-range condition information, because the customer's premises is typically at the end of the resource distribution network. For example, if validation device 223 determines that the power is out at premises 234, validation device 223 may initiate a query to validation devices 221 and 222. Validation devices 221 and 222 may respond that the power is connected at premises 232 and 233 respectively, providing insight that the power outage may be confined to premises 234. Alternatively, if validation devices 221 and 222 respond that the power is out at premises 232 and 233, then the scope of the outage may be better defined because the outage information is based on more than a single device reporting an outage.

After a validation device verifies an out-of-range condition, the validation device may take action. The action may include controlling a device on the resource distribution network. In one aspect, a validation device may detect and verify that volt-ampere reactive (VAR) power is out-of-range and then add or remove capacitor banks to improve the power factor.

In one aspect, an initiating validation device and the responding validation device may be on the same phase. For example, an initiating validation device and a responding validation device may be configured to measure VAR on the same distribution line. In such a configuration, one validation device may be located upstream relative of the initiating validation device and another validation device may be located downstream.

Monitoring the load on multiple phases can be important, for example because certain kinds of premises equipment use power from multiple phases and require that the VAR on each phase be consistent. Therefore, an initiating validation device and a responding validation device may be configured to detect whether the load is consistent between different phases. An initiating validation device may detect the load on a first phase, and various responding validation devices may be configured to detect the load on other phases. In this manner, the initiating validation device can obtain load information about the other phases. The validation devices may be selected to measure a condition, such as VAR, VA, at similar locations, such as the points of service, i.e., premises, or at similar distances from a feeder or other distribution equipment.

In another aspect, a validation device may detect and verify an out-of-range voltage condition and then adjust a voltage regulator to improve the voltage. In yet another aspect, a validation device located at a premises may detect an out-of-range temperature. After validating the out-of-range temperature, the validation device may disconnect power to the premises. In addition to or as an alternative, the validation device may communicate an alarm, provide a notification, or transmit a message regarding the verified condition.

Exemplary Method of Operation

Figure 3:
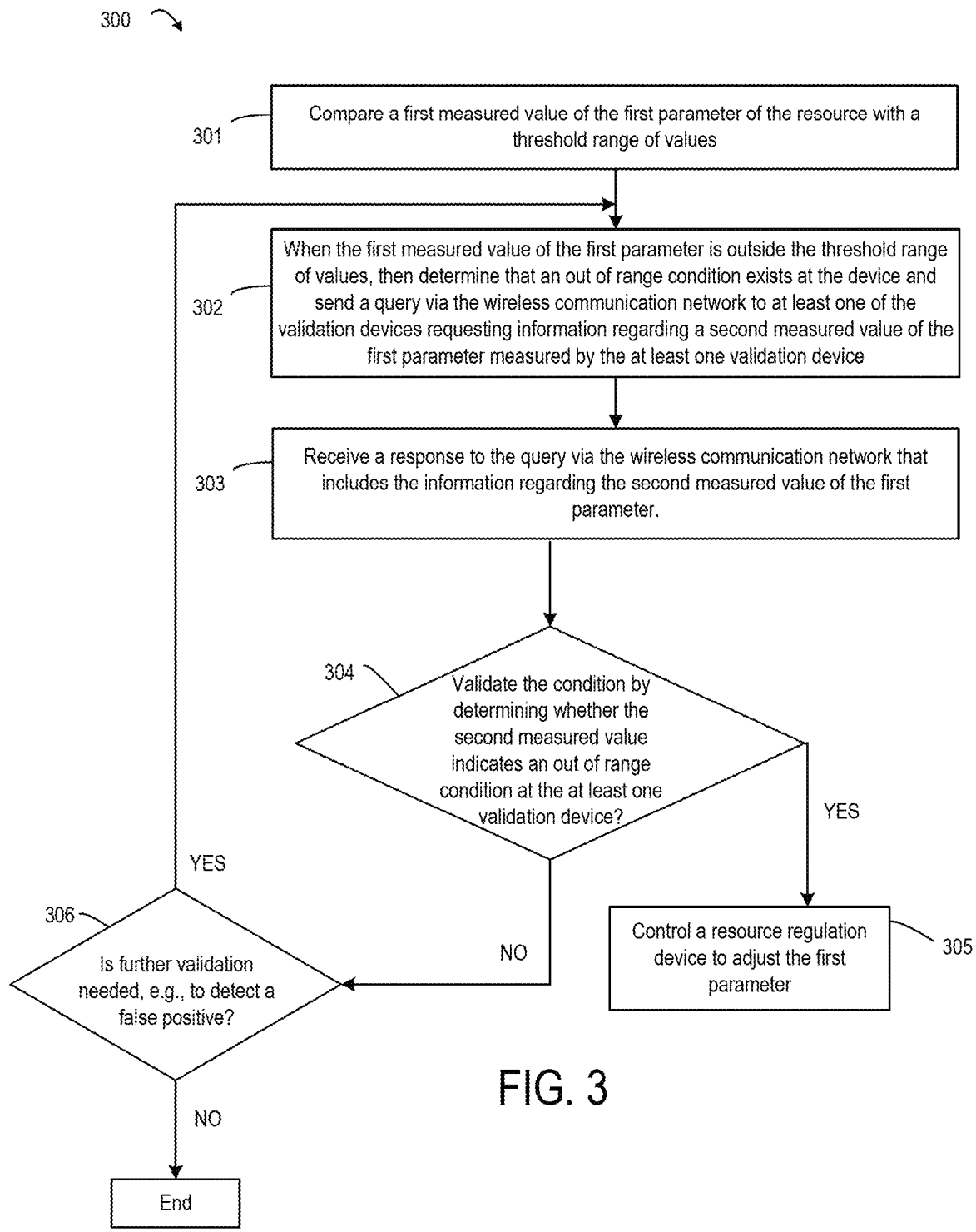
FIG. 3 is a flowchart illustrating an exemplary process for distributed verification.

FIG. 3 is a flowchart illustrating an exemplary process performed by a verification device to detect and verify an out-of-range condition. FIG. 3 is described with respect to FIG. 1, but other configurations are possible. A validation device, e.g., validation device 123, uses a sensor configured to measure a first parameter of a resource distributed along the first distribution line, e.g., 143, of a resource distribution network 100. The validation device communicates with other devices on the resource distribution network via a wireless mesh network.

The parameter measured by the sensor can vary based on the type of resource distributed and by the system configuration. For example, for electrical distribution systems, the parameter may include the availability of the resource (e.g., whether the electricity is connected), current, voltage, load factor, power factor, temperature, consumption, or other parameter related to the operation of the resource distribution network or to a status of the device (e.g. detected theft or tampering).

In a system configured to detect theft or tampering, a set of validation devices can detect tampering with a meter. For example, in an apartment complex, power usage of similar apartments is expected to be similar. Two one-bedroom apartments are expected to use approximately the same amount of power. An example system may be a bank of power meters. In the event that an initiating validation device detects an abnormally low amount of power consumption, the initiating validation device can query validation devices configured to measure power consumption at other apartments. In the event that the responding validation devices detect similarly low power usage at other apartments, the initiating validation device may determine that the power consumption is not abnormal. In contrast, in the event that the responding validation devices detect significantly higher power consumption, then the initiating validation device may determine that the power consumption is abnormal and indicative of tampering. Such a determination can then be transmitted to the head-end system.

In another aspect, a theft system can be configured to use an accelerometer or other device to determine whether a power meter has been physically tilted or moved. In this case, the initiating validation device monitors the accelerometer for movement, and when movement is detected that is beyond a threshold, the initiating validation device may sound an alarm. For example, a threshold may be a range of movement beyond what is expected, such as 120 or 180 degrees of rotation. The initiating validation device may also query responding validation devices that have accelerometers and are installed on other meters in the same location to determine whether the other meters are also being tilted or moved.

In yet another aspect, an initiating validation device can measure load and movement and can use one measurement to validate the other. For example, an initiating validation device that detects movement of a meter can then initiate a load verification across multiple validation devices in the same apartment complex to determine whether the meter that was moved is also measuring an abnormally low use of power. An initiating validation device may also identify a particular device as experiencing a potential tamper condition and communicate a message to the head-end system for follow-up.

In gas or water distribution systems, the validation devices can measure leaks, consumption, availability of the resource, pressure, temperature, or flow rate. For example, an initiating validation device can measure gas pressure on a gas pipe. An initiating validation device detects an abnormally low amount of gas pressure. The initiating validation device sends a query to responding validation devices, some of which are located downstream and others upstream from the initiating validation device. Based on the measured pressure at different locations on the gas line, the initiating validation device can determine the approximate location of the gas leak and alert the head-end system as appropriate.

At step 301, method 300 involves comparing a first measured value of the first parameter of the resource with a threshold range of values. For example, initiating validation device 123 may detect a voltage and may compare it to a voltage range associated with a customer premises, such as a range of 115-125 volts. The threshold range of values used at step 301 can be provided to the initiating validation device during an installation or configuration process or can be obtained by querying another device. The range may be static or dynamic. A range may vary based on a historical usage pattern. In this example, the range may be different for residential areas during the early evening hours on weekdays due to increased demand as people arrive home.

At step 302, method 300 involves determining an out-of-range condition at the initiating device. When the first measured value of the first parameter is outside the threshold range of values, then the initiating device determines that an out-of-range condition exists at the initiating device and sends a query via the wireless communication network to at least one of the responding validation devices requesting information regarding a second measured value of the first parameter measured by the at least one validation device. In this example, the initiating validation device may send a query to validation devices located at different points along distribution line 143.

In one aspect, the query contains a request for a second measured value of the first parameter. The responding validation device provides the measured value of the first parameter at the responding validation device. The initiating validation device receives and processes the second measured value. The initiating validation device determines a tolerance for the second measured value, for example by consulting an internal table, or messaging a head end system.

In another aspect, the query contains a request for the second measured value of the first parameter and a tolerance for the second measured value. In this configuration, the initiating validation device need not know the tolerance for the second measured value at the responding validation device. Instead, the responding validation device provides the tolerance to the initiating validation device. In yet another aspect, the responding validation device responds to the query from the initiating validation device in the form of a message that contains "normal" or "alert" indication. In this case, the initiating validation device need not calculate whether a second measured value exceeds a tolerance. An initiating validation device can also request further information after receiving the second measured value, such as additional measurements, historical data, etc.

In another aspect, the initiating validation device can request different information based on the frequency of how often information is shared between initiating and responding validation devices. For example, in this configuration, the initiating validation device can obtain a tolerance value for the second measured value of the first parameter from a responding validation device, then receive an updated tolerance value after a certain number of messages or after a certain amount of time. Messages can be in a standard format, such as a standard such as WiSUN, to facilitate interoperability between devices from different vendors.

At step 303, method 300 involves receiving a response to the query via the wireless communication network from each of the responding validation devices that includes the information regarding the second measured value of the first parameter. The information can include the second measured value itself or an indication of whether the second measured value is within or outside a range. The responding validation devices may detect the second measured value of the first parameter in response to receiving the query from the initiating validation device or may use a previously measured value. If the responding validation device responds with an indication that the value is within or outside a range of values, then the responding validation device compares a measured value to a range of values or to a threshold value before responding.

At step 304, method 300 involves validating the condition when the information provided by the responding validation devices is consistent with the out-of-range condition detected by the initiating validation device.

When a responding validation device returns the second measured value, then the initiating validation device determines whether the second measured value indicates an out-of-range condition. The initiating validation device may compare the first measured value and the second measured value of the first parameter, or may compare the second measured value with the threshold range of values for the second measured value. When there are multiple responding validation devices, different comparisons or determinations may be used for different devices.

If the threshold range of values is the same for the first and second measured values, then the initiating validation device may compare the first and second measured values and if the values are within a predetermined tolerance may validate the out-of-range condition. The tolerance value may be programmed into the device, for example, by an installation file, or may be adjusted over time, crowd-sourced (i.e., determined from other validation devices), or determined based on historical data. In other instances where the threshold range of values for the second measured value is different than the range for the first measured value, the initiating validation device may compare the second measured value to the appropriate threshold range of values to determine whether the second measured value is consistent with the out-of-range condition. In this example, if the responding verification device is located at a point on distribution line 143 where the acceptable voltage range is different than the acceptable voltage range for validation device 123, then the threshold range of values for the second measured value is different than the threshold range of value for the first measured value. In this example of a 120-volt power distribution system, an upstream range of values may be 120-130 volts.

When the out-of-range condition is validated at step 304, the method proceeds to step 305, where the method 300 involves controlling a resource regulation device to adjust the first parameter. A resource regulation device is any device that can control, limit, disconnect, or connect the resource. In this example, the resource regulation device may be a voltage regulator capable of adjusting the voltage or an electric meter capable of switching off the power. Alternatively, a resource regulation device may be a load balancing device. The resource regulation device may or may not be co-located with the validation device.

Other types of action may be taken in response to validating the out-of-range condition. Some out-of-range conditions may be addressed by a head end system or may require head end system authorization. If so, the validation device may take action by notifying the head end system of the validated condition and then proceeding as instructed by the head end system. Corrective action can also take the form of delivering a notification to a customer such as a call or email, a post to the customer service website, sounding an alarm, or creating a log of the out-of-range condition. For example, a log can be maintained with events, and when the number or severity of events reaches a certain level, further corrective action can be taken.

When the out-of-range condition is not validated at 304, then the method proceeds to step 306 and the method 300 involves determining whether further validation is needed. In some instances, if the second measured value does not indicate an out-of-range condition, then the initiating validation device may conclude that further validation attempts are needed. Additional validation attempts may include querying different responding validation devices, sending another query to the same responding validation device, or measuring a different parameter. Therefore, for example, the initiating validation device may return to step 302 and send another query to different responding validation devices. Alternatively, the initiating validation device may return to step 303 and await the responses from other responding validation devices.

Alternatively, the initiating validation device may conclude that it measured a false positive and the method may end. The decision as to whether to proceed with additional validation attempts may be made by the initiating validation device, the head end system, or a combination of both the initiating validation device and the head end system.

Methods other than that illustrated by FIG. 3 may be used to verify an out-of-range condition. The initiating validation device may query more than one responding validation device. If so, then the initiating validation device may be configured to require that all of the responses from the responding validation devices are consistent with the out-of-range condition detected by the initiating node, may be configured to require that a majority of the responses are consistent, or may be configured to require at least a minimum number of the responses are consistent. Other validation requirements are also possible.

Verification may consider previously measured values to determine whether an out-of-range condition exists. For example, in addition to the first measured value in step 302, an initiating validation device may consider one or more previously measured values for the first parameter.

Exemplary Communication Network

Figure 4:
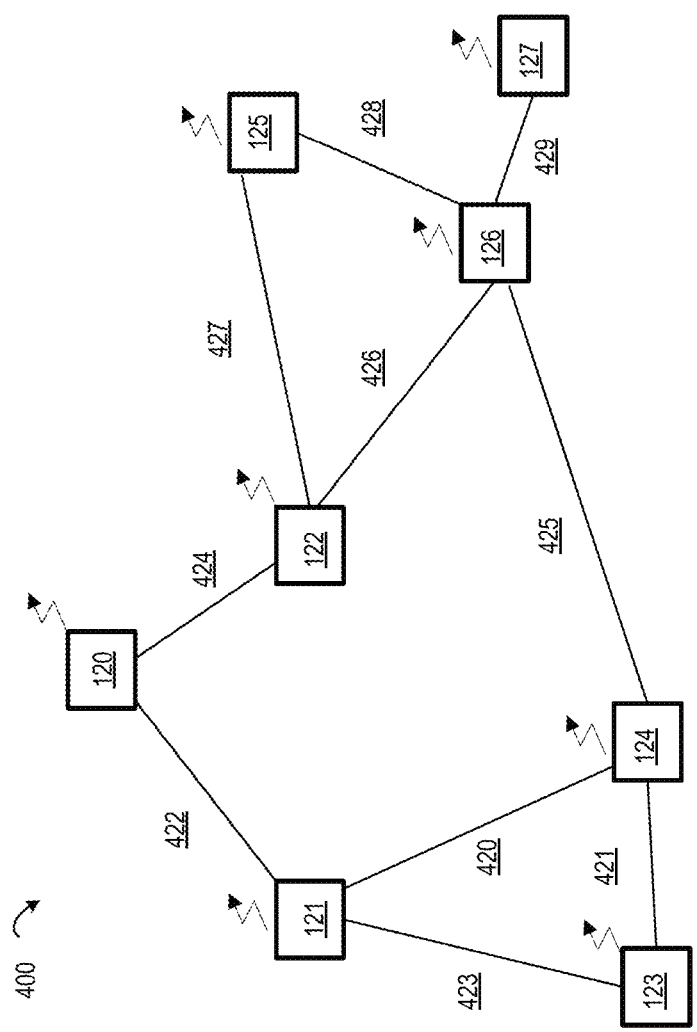
FIG. 4 illustrates an exemplary topology of a communications network.

In some implementations, the validation devices communicate with each other via a wireless network. FIG. 4 illustrates an exemplary wireless network topology for a communication network that connects the validation devices of FIG. 1. Wireless network topology 400 includes validation devices 120-127, each of which may be associated with a node on the communication network. The validation devices 120-127 communicate with each other via connections or links 420-429. For example, connection 422 connects validation device 120 to validation device 121. Connection 424 connects validation device 120 to validation device 122. Therefore validation device 120 may communicate with both validation device 121 and validation device 122. Similarly, connection 427 connects validation device 125 to validation device 122. Connection 428 connects validation device 125 with validation device 126. Therefore, validation device 125 can communicate directly with validation devices 126 and 122 and communicate with validation device 127 through validation device 126 and connection 429. When the communication network is a wireless mesh network, the connections between the devices is dynamic. The communications network may also include nodes that are not associated with a validation device (not shown).

In other implementations, the validation devices communicate with each other using other types of communication networks, including PLC and cellular communication networks.

Validation Device Tables

An initiating validation device may use a table or list to determine which responding validation devices to query to validate a condition. There may be different tables for different conditions or a single table that lists responding validation devices for multiple conditions.

FIG. 5 illustrates two exemplary validation device tables 501 and 503. Table 501 represents a validation device table for validation device 224 in FIG. 2. It includes entries 501a-n, each entry corresponding to a validation device. In this case, only entries 501a-501b are populated. Each entry 501a-501b corresponds to a responding validation device. Entry 501a corresponds to validation device 225 and entry 501b corresponds to validation device 220. The table includes information about the location of each device, such as distribution line 241, distribution line 242, the parameter measured by each device, such as voltage, and the status of each device.

Table 503 represents a validation device table for validation device 221 in FIG. 2. It includes entries 504a-504n.

Entry 504*a* corresponds to validation device 222, located on distribution line 244, entry 504*b* corresponds to validation device 223 located on distribution line 245, and entry 504*c* corresponds to validation device 220 located on distribution line 242. The table also indicates that validation device 220 is located upstream of validation device 221 and that the devices are measuring voltage.

The information in the tables may vary and may include information other than that illustrated in FIG. 5. For example, if there are different tables for different conditions, then the parameter information may not be included in the table. Other ways of representing the information may also be used. For example, location may be described by GPS coordinates or may be relative to the initiating validation device.

A validation device may receive a validation device table from a head end system, may receive it from another device, may build it, or may use a combination of these approaches. A validation device may determine the location of another validation device by requesting location information from the validation device or from the head end system, may measure the time it takes to receive an acknowledgement of a message sent to the validation device, or may use other approaches. The validation device table may change over time to reflect devices joining and leaving the communications network or the resource distribution network or to account for other changes in the devices, the networks, or the parameters being measured.

If the validation devices use a wireless mesh network to communicate, then a device may maintain a neighbor table and use it to route communications on the network. The neighbor table used for routing may be independent and distinct from the validation device table. For example, a validation device may communicate with a neighboring device, but may not query the neighboring device to verify a condition. Alternatively, a validation device may query devices listed in its neighbor table, either alone or in addition to querying devices listed in a validation device table, to confirm a detected condition. If a validation device builds a validation device table, it may request information from devices in its neighbor table and use that information to build the table.

In some aspects, a head end system may maintain a validation table listing all of the validation devices of the resource distribution network. The table may identify a type for each of the validation devices in the table. Exemplary types of validation devices include a bellwether meter, a master device, and a slave device. Currently, some resource distribution networks designate selected meters as bellwether meters and use information received from these meters to manage aspects of the resource distribution network. If a bellwether meter is also an initiating validation device, then it may verify information prior to sending it to a head end system by querying one or more responding validation devices. A bellwether meter that is also an initiating validation device may also take corrective action. If a bellwether meter is a responding validation device, then it may respond to queries from initiating validation devices. In some instances, an initiating validation node may weigh a response from a bellwether meter differently than a response from a non-bellwether meter.

If a validation device is designated as a master device, then it may collect feedback or other information from slave devices and take action based on such feedback. The slave devices may not be able to take action on their own or may only be able to take certain types of action, and may rely upon the master node to take action to improve an out-of-range condition. In one example where there are multiple validation devices located along a distribution line, one of the validation devices is a master and the other validation devices are slaves.

The head end system may use its validation table to generate validation tables for individual validation devices. The validation tables for the individual validation devices may be provided to the devices when they are installed or may be provided or updated after installation via a communication from the head end system.

Validation Devices and Temperature

Figure 6:
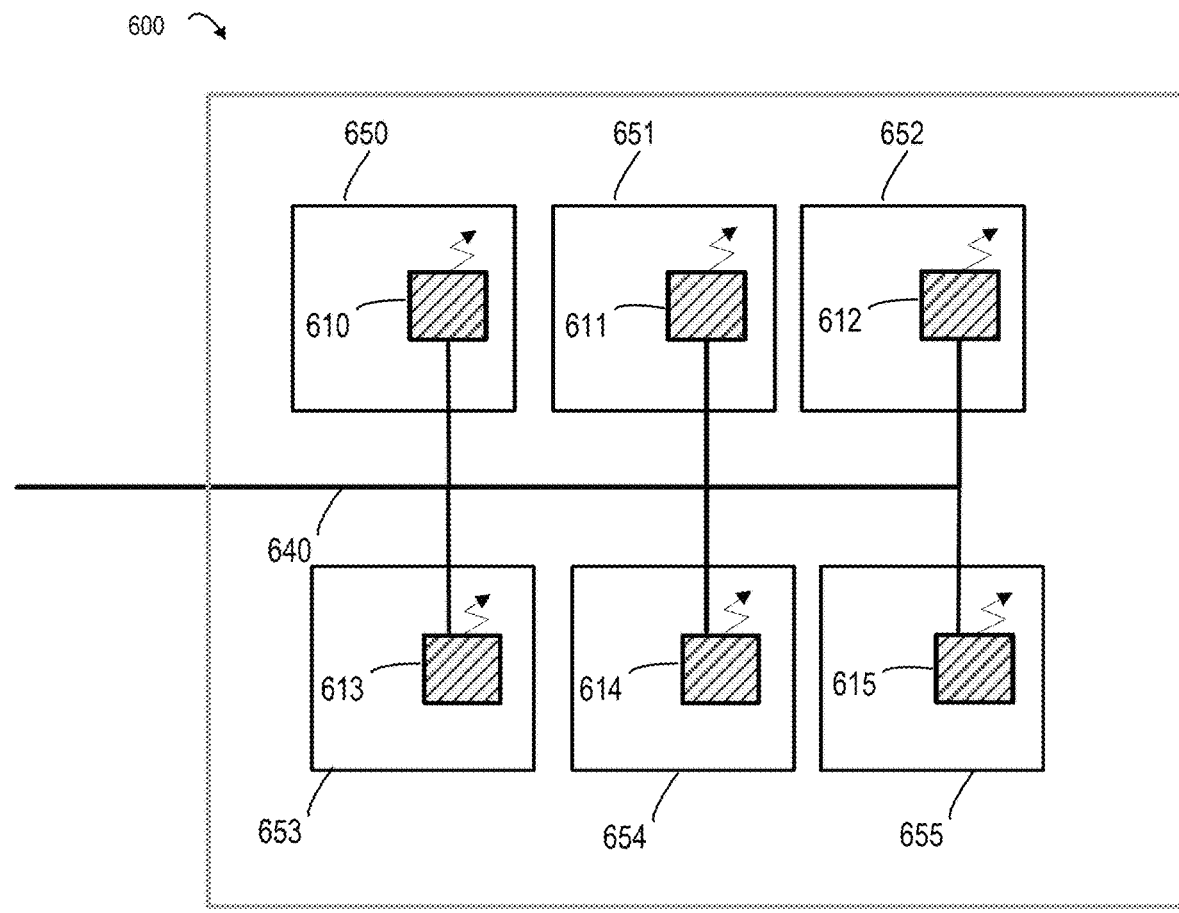
FIG. 6 illustrates exemplary validation devices for multiple premises.

FIG. 6 illustrates a portion of an exemplary electrical distribution system that serves a multi-family or multi-tenant building. The system 600 includes six premises 650-655 and six validation devices 610-615, but any number is possible. Distribution line 640 provides power to premises 650-655. Validation device 610 is connected to premises 650, validation device 611 connected to premises 651, and so on. In this example, the validation devices are electric meters that include temperature sensors that measure temperature and are proximate to one another, i.e., located in the same area, such as along the same wall of the building.

In electrical systems, if a connection is poor and too much current is flowing, the excessive current may heat the connection to a dangerous level creating a hot socket condition. A device may be configured to disconnect the power when a hot socket is detected. However, other conditions that cause a high temperature do not require disconnecting the power. A validation device may be able to distinguish between these types of conditions by querying other validation devices. For example, if validation device 610 detects a high temperature, then it may query other validation devices located in the same area to determine whether the high temperature is due to environmental factors, such as prolonged exposure to sunlight. If the responding validation devices indicate that they are also sensing a high temperature, then validation device 610 may not determine that a hot socket condition exists. The likelihood that multiple meters are experiencing a hot socket condition is much smaller than the likelihood that the multiple meters are experiencing high temperatures due to environmental factors.

Exemplary Validation Device

Figure 7:
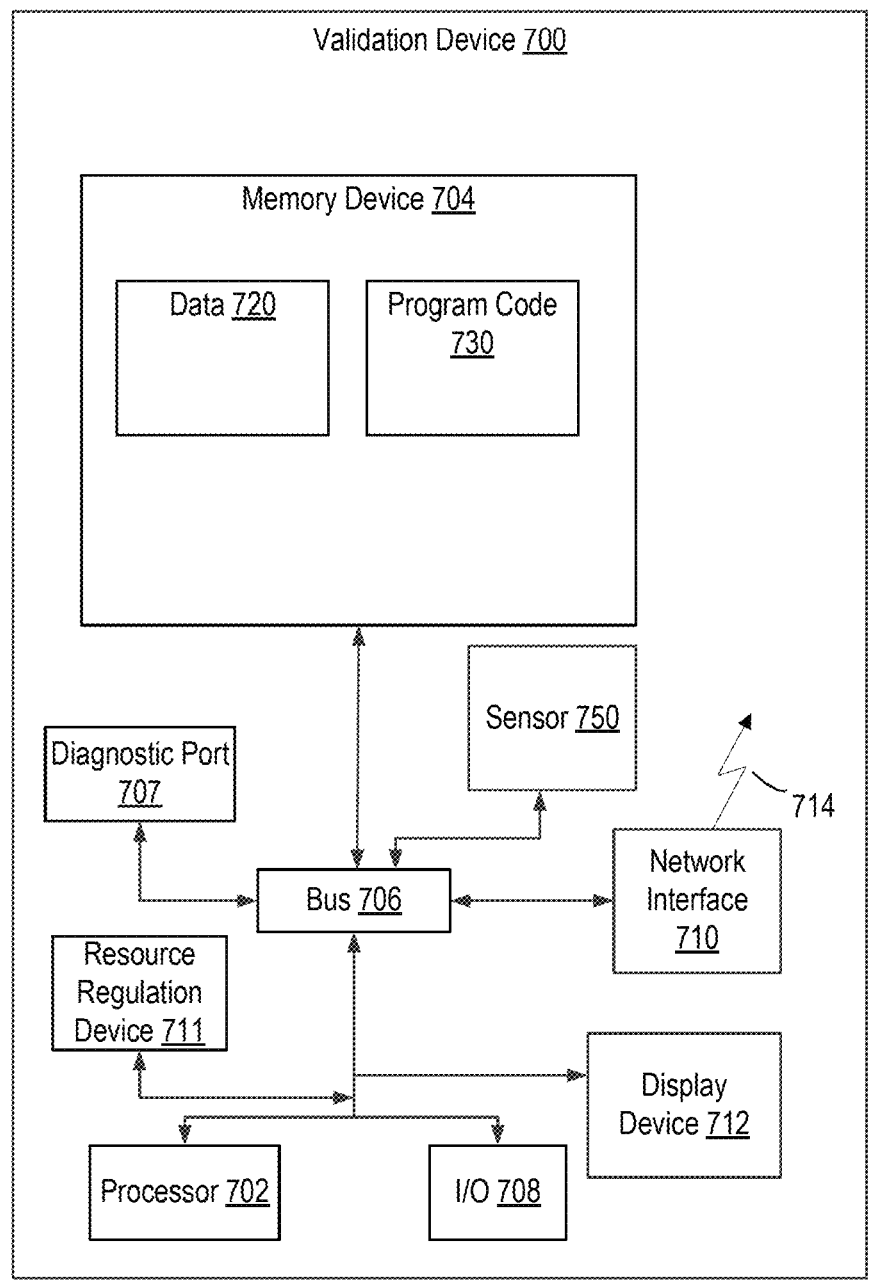
FIG. 7 illustrates an exemplary validation device.

FIG. 7 illustrates an exemplary validation device. Any suitable computing system may be used for performing the operations described herein. The depicted example of a validation device 700 includes a processor 702 communicatively coupled to one or more memory devices 704. The processor 702 executes computer-executable program code 730 stored in a memory device 704, accesses data 720 stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices or cores, including a single processing device. The functionality of the validation device may be implemented in hardware, software, firmware, or a combination thereof.

The validation device 700 includes at least one sensor 750 configured to measure parameters relating to the resource of a resource distribution network. For example, in an electricity distribution system, the sensor 750 can measure power consumption, voltage, current, etc. In a gas distribution system, the sensor 750 may check for gas leaks. In some aspects, the validation device 700 may include multiple sensors. For example, a validation device 700 may include both a power and a temperature sensor.

The validation device 700 may include at least one resource regulation device 711. Resource regulation device 711 is configured to control a resource, such as power, water, gas, etc. The resource regulation device 711 may disconnect, reconnect, slow down, speed up, or otherwise adjust the resource. In some embodiments, the resource regulation device 711 may be remotely located from the validation device 700.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The validation device 700 may also include a number of external or internal devices, such as input or output devices. For example, the validation device 700 is shown with one or more input/output ("I/O") interfaces 708. An I/O interface 708 can receive input from input devices or provide output to output devices. One or more busses 706 are also included in the validation device 700. The bus 706 communicatively couples one or more components of a respective one of the validation device 700.

The validation device 700 may also include a diagnostic port 707. Diagnostic port 707 may be used, for example, by the equipment vendor or the utility company, to determine whether the validation device is operating correctly, or to diagnose and remedy issues, or perform a firmware upgrade of validation device 700.

The validation device 700 executes program code 730 that configures the processor 702 to perform one or more of the operations described herein. For example, the program code 730 causes the processor to perform the operations described in FIG. 3.

The validation device 700 also includes a network interface device 710. The network interface device 710 includes any device or group of devices suitable for establishing a wired or wireless data connection to one or more data networks. The network interface device 710 may be a wireless device and have an antenna 714. The validation device 700 can communicate with one or more other computing devices implementing the validation device or other functionality via a data network using the network interface device 710.

The validation device 700 can also include a display device 712. Display device 712 can be a LCD, LED, touch-screen or other device operable to display information about the validation device 700. For example, information could include an operational status of the validation device, network status, etc.

In conjunction with other validation devices, a validation device becomes more powerful and useful. For example, a validation device that queries other validation devices has more information on which to base any decision or corrective action. For example, a validation device that can query another validation device on the same distribution line may correctly conclude that resource unavailability is limited to one premises or block instead of concluding that entire part of network does not have access to the resource. Additionally, a validation device can detect false positive events, for example, a bad sensor on one validation device can be verified by parameters measured from nearby validation devices.

Validation devices may measure other parameters than those on traditional resource distribution networks. For example, a validation device can measure the availability of public resources. For example, a validation device installed on a street light can measure whether a street light is operational or has ceased to work, for example, due to failure of a lighting element. A validation device can also measure environmental pollutants. For example, a validation device installed on a street light can measure smog, communicate with other validation devices also measuring smog, and determine the extent of the smog. Similarly, a validation device can be an in-home methane sensor. The corrective action can be a signal to the network to determine scope of outage/area of pollution, and create a perimeter based on the gathered events.

Validation devices may be configured to detect and verify any type of condition. Although the foregoing describes the detection and verification of an out-of-range condition, the invention also includes the detection and verification of other types of conditions, including a condition within an acceptable range.

Figure 8:
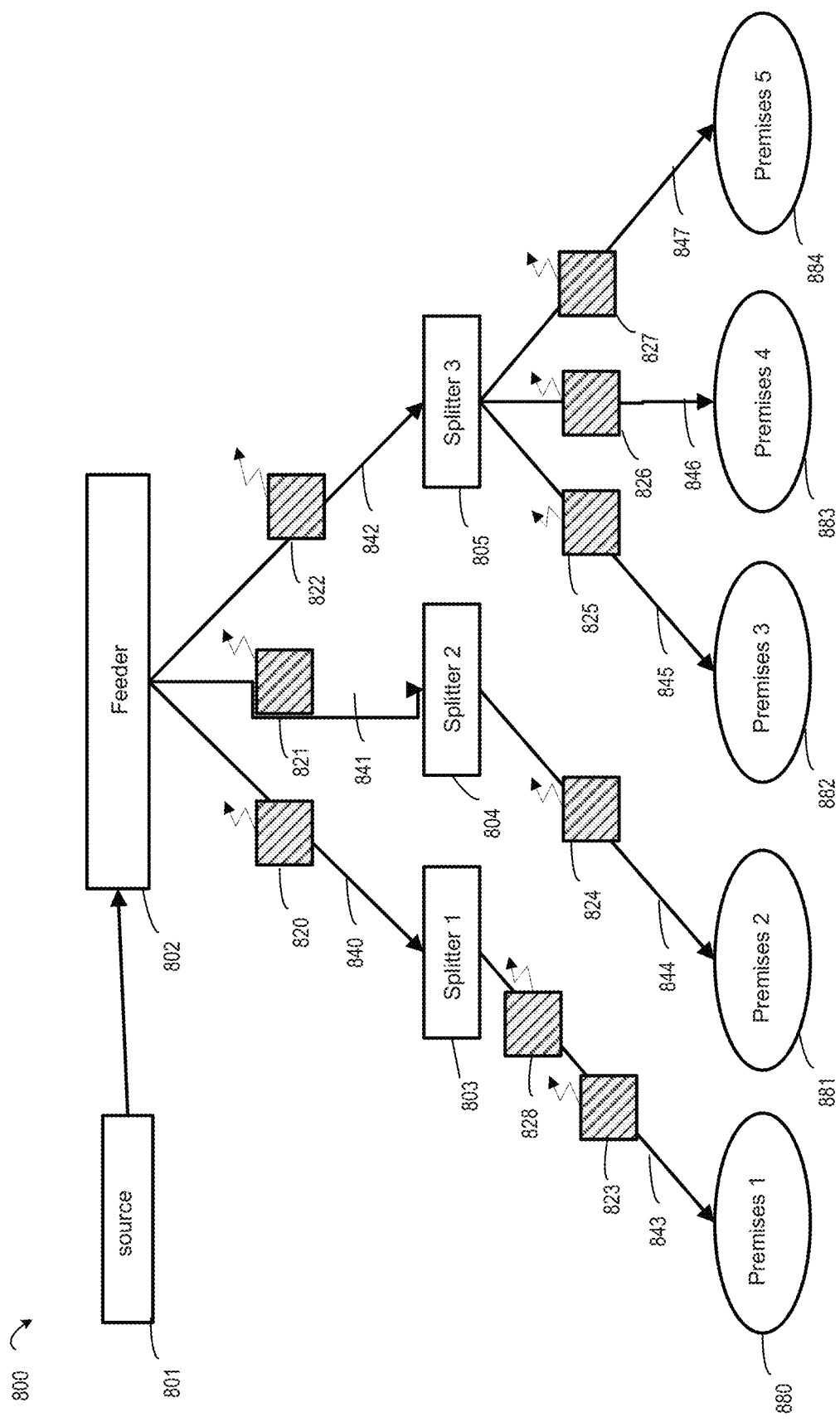
FIG. 8 illustrates a physical topology of an exemplary resource distribution network showing validation devices at various points in the network.

FIG. 8 illustrates a physical topology of an exemplary resource distribution network showing validation devices at various points in the network. The resource distribution network 800 includes validation devices that are capable of measuring conditions, validating conditions with other validation devices, and taking corrective action as necessary.

The resource distribution network 800 includes source 801, feeder 802, splitters 803-805, validation devices 820-828, distribution lines 840-847, and premises 880-884. Validation devices 820-828 may be located at different positions on distribution lines 840-847. For example, FIG. 8 illustrates validating device 828 (e.g., an initiating validation device) located at a first position on distribution line 843 and validation device 823 (e.g. a responding validation device) located at a second position on distribution line 843.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system for detecting a condition in a resource distribution system, the system comprising:
   an initiating validation device connected at a first location on a distribution line of a power distribution network; and
   a responding validation device connected at a second location on the distribution line, wherein:
   a feeder of the power distribution network receives power from a transformer and provides power to the distribution line, and
   each of the initiating validation device and the responding validating device comprises a sensor configured to measure a first parameter related to power distributed along the distribution line, is associated with a respective different node on a wireless communications network, and is configured to communicate on the wireless communications network, and wherein the initiating validation device is configured to:
compare a first measured value of the first parameter with a threshold range of values;
responsive to determining that the first measured value of the first parameter is outside the threshold range of values:
determine that an out-of-range condition exists at the initiating validation device,
identify, from a device list, the responding validation device, and
send a query via the wireless communication network to the responding validation device, wherein the query requests information regarding a second measured value of the first parameter and wherein in response to receiving the query from the initiating validation device, the responding validation device:
obtains the second measured value of the first parameter,
determines a response to the query based on only the second measured value of the first parameter, and
transmits the response via the wireless communication network to the initiating validation device, and
wherein the initiating validation device is further configured to:
receive, via the wireless communication network, the response to the query, wherein the response includes the information regarding the second measured value of the first parameter;
determine that the information is received from the responding validation device, the information comprising the second measured value that indicates an out-of-range condition at the responding validation device; and
responsive to determining that the information is received, validate the out-of-range condition, transmit an indication of the out-of-range condition to a head-end device, and control a resource regulation device to adjust the first parameter.

2. The system of claim 1, wherein the initiating validation device is further configured to:
responsive to detecting that the second measured value of the first parameter does not include an out-of-range parameter, send a second query via the wireless communication network to an additional responding validation device, the second query requesting a third measured value of the first parameter; and
when the third measured value of the first parameter indicates an out-of-range parameter, validating the out-of-range condition and controlling a resource regulation device to adjust the first parameter.

3. The system of claim 1, wherein the resource distribution system further comprises a head-end system and wherein the initiating validation device is further configured to:
transmit, via the wireless communication network and to the head-end system, the first measured value and the second measured value.

4. The system of claim 1, wherein the initiating validation device maintains a validation device list comprising a plurality of entries for plurality of validation devices; and
wherein the initiating validation device is further configured to, responsive to determining that one of the plurality of validation devices is either (i) no longer active, or (ii) no longer configured to measure the first parameter, remove the one of the plurality of validation devices from the validation device list.

5. The system of claim 1, wherein the resource distribution system further comprises a head-end system, the first parameter is power factor, the threshold range of values corresponds to a range of power factors, and the initiating validation device is further configured to transmit, via the wireless communications network, a command causing an adjustment to the power factor.

6. The system of claim 1, further comprising a plurality of validation devices, each of the plurality of validation devices associated with a respective phase of three-phase power distribution, wherein the first parameter is a voltage of a phase, the condition represents a voltage threshold, and wherein the initiating validation device is further configured to:
determine, from the device list, a plurality of validation devices on a selected phase; and
send a query via the wireless communication network to at least one of the plurality of validation devices on the selected phase, requesting a second measured value of the first parameter measured by at least one of the plurality of validation devices on the selected phase.

7. The system of claim 1, wherein the first parameter is electrical power consumption, the condition is determined from detecting that the first parameter is outside the threshold range of values, the threshold range of values defines maximum power consumption, and the initiating validation device is further configured to take further corrective action, the corrective action further comprising disconnecting electrical power.

8. The system of claim 1, further comprising a plurality of validation devices associated with different premises, wherein the first parameter is electric power consumption, wherein the initiating validation device is further configured to query the plurality of validation devices associated with different premises, and wherein controlling a resource regulation device to adjust the first parameter comprises disconnecting electrical power at a premises associated with one of the pluralities of validation devices.

9. A method for detecting and verifying a condition in a resource distribution network, comprising:
determining, at an initiating validation device in a power distribution network, a first value of a first parameter of a resource distributed along a first distribution line at a first location;
determining, at the initiating validation device, whether the first value of the first parameter is outside a first threshold range of values;
responsive to determining, at the initiating validation device, that the first value of the first parameter is outside the first threshold range of values:
identifying, from a device list comprising a plurality of validation devices, a responding validation device; and
sending a query via a wireless communication network to a responding validation device, wherein the query requests information about a second value of the first parameter at the responding validation device, wherein the responding validation device is located at a second location along a second distribution line of the resource distribution network;
responsive to receiving, at the responding validation device, the query from the initiating validation device:
obtaining, at the responding validation device, the second value of the first parameter, determining, at the responding validation device, a response to the query based on only the second value, and transmitting, at the responding validation device, the response via the wireless communication network to the initiating validation device;

receiving, at the initiating validation device, a response to the query via the wireless communication network that includes the information about a second value of the first parameter detected by the responding validation device;

responsive to determining, at the initiating validation device, that the information about the second value of the first parameter detected by the responding validation device indicates that the first parameter is outside a second threshold range of values, then validating an out-of-range condition for the first parameter; and controlling, at the initiating validation device, a flow of the resource along the first distribution line.

10. The method of claim 9, wherein:

the resource is three-phase electrical power;

the first parameter is voltage;

the first distribution line distributes a first phase of electrical power;

the second distribution line distributes a second phase of electrical power;

the first threshold range of values is based on the first phase of electrical power; and the second threshold range of values is based on the second phase of electrical power.

11. The method of claim 9, wherein:

the second distribution line is located upstream from the first distribution line; and the first threshold range of values and the second threshold range of values differ and are based on relative locations of the first distribution line and the second distribution line.

12. The method of claim 9, wherein the receiving comprises receiving an indication that the responding validation device detected an out-of-range condition for the first parameter or receiving the second value of the first parameter detected by the responding validation device.

13. The method of claim 9, wherein validating an out-of-range condition comprises:

receiving responses from at least two responding validation devices indicating that the at least two responding validation devices detected that the first parameter is outside the second threshold range of values.

14. A method for detecting and verifying a condition in a resource distribution network, comprising:

determining, at an initiating validation device located at a first location on a first distribution line of a power distribution network, a value of a first parameter of a resource distributed along a distribution line of the resource distribution network;

determining, at the initiating validation device, whether the value of the first parameter is outside a threshold range of values;

responsive to determining, at the initiating validation device, that the value of the first parameter is outside the threshold range of values:

identifying a plurality of responding validation devices, and sending a query via a wireless communication network to the plurality of responding validation devices, the query requesting information about a value of the first parameter detected by each of the plurality of responding validation devices, wherein each of the plurality of responding validation devices is located at a respective location on the distribution line;

receiving, from the validation devices, a plurality of responses to the query via the wireless communication network, wherein each response includes the information about the value of the first parameter detected by a respective one of the validation devices; and responsive to determining that the information about the value of the first parameter detected by the validation devices indicates that the first parameter is outside a second threshold range of values:

validating an out-of-range condition for the first parameter; and controlling a device on the resource distribution network to adjust the first parameter.

15. The method of claim 14, further comprising:

determining, from the plurality of responses, a subset of responses indicating the out-of-range condition; and determining, based on the subset of responses, a geographic area affected by the out-of-range condition.

16. The method of claim 14, wherein the method is performed by a meter located at a first premises, the resource is electricity, the first parameter is temperature, and the validation devices are associated with different premises and are located proximate to one another and to the meter, further comprising:

when the plurality of responses received from the validation devices indicates that the first parameter is within the second threshold range of values, then validating a hot socket condition at the meter; and controlling the meter to disconnect the electricity.

\* \* \* \* \*